(12) United States Patent
Lee et al.

(10) Patent No.: US 9,718,456 B2
(45) Date of Patent: Aug. 1, 2017

(54) TORQUE ASSIST BASED ON BATTERY STATE OF CHARGE ALLOCATION

(71) Applicant: Ford Global Technologies, LLC, Dearborn, MI (US)

(72) Inventors: Minku Lee, Ypsilanti, MI (US); Francis Thomas Connolly, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 134 days.

(21) Appl. No.: 14/669,045

(22) Filed: Mar. 26, 2015

(65) Prior Publication Data

US 2016/0280206 A1 Sep. 29, 2016

(51) Int. Cl.
*B60W 10/26* (2006.01)
*B60W 10/08* (2006.01)
*B60W 10/06* (2006.01)
*B60W 30/182* (2012.01)
(Continued)

(52) U.S. Cl.
CPC ............ *B60W 20/13* (2016.01); *B60W 10/06* (2013.01); *B60W 10/08* (2013.01); *B60W 10/26* (2013.01); *B60W 20/15* (2016.01); *B60W 30/182* (2013.01); *B60W 2510/244* (2013.01); *B60W 2540/04* (2013.01); *B60W 2540/10* (2013.01); *B60W 2710/06* (2013.01); (Continued)

(58) Field of Classification Search
CPC ...... B60W 20/00; B60W 20/15; B60W 20/16; B60W 20/19; B60W 20/13; B60W 20/14; B60W 10/24; B60W 10/26; B60W 2510/24; B60W 2510/242; B60W 2510/244; B60W 2710/24; B60W 2710/242; B60W 2710/244; B60W 30/182; B60W 2540/04; B60W 2540/103; H02J 7/007; H02J 7/0073; H02J 7/0075; H02J 7/0077; H02J 7/0078; H02J 7/0008; H02J 2007/0098

See application file for complete search history.

(56) References Cited

U.S. PATENT DOCUMENTS 6,435,294 B1 * 8/2002 Hara .................. B60K 6/48 180/65.25
2005/0061561 A1 * 3/2005 Leonardi .................. B60K 6/28 180/65.1
2007/0187161 A1 8/2007 Kiuchi
(Continued)

FOREIGN PATENT DOCUMENTS

JP 2001263120 A * 9/2001 ............. B60K 6/543

*Primary Examiner* — Thomas G Black
*Assistant Examiner* — Sara Lewandroski
(74) *Attorney, Agent, or Firm* — David B. Kelley; Brooks Kushman P.C.

(57) ABSTRACT

A hybrid vehicle includes a traction battery, an internal combustion engine, an electric machine configured to provide torque assistance to the engine, and a controller or a powertrain control system having a controller. The controller is programmed to respond to a percentage of state of charge (SOC) allocated for torque assistance. An allocation for torque assistance is a change in SOC of the battery attributed to a current flow to the electric machine for torque assistance. When the change in SOC attributed to the current flow is greater than a predetermined change, the controller will halt the current flow to the electric machine to cease torque assistance.

14 Claims, 3 Drawing Sheets

(51) Int. Cl.
    *B60W 20/13*     (2016.01)
    *B60W 20/15*     (2016.01)

(52) U.S. Cl.
    CPC .... *B60W 2710/083* (2013.01); *Y02T 10/7275* (2013.01); *Y10S 903/93* (2013.01)

(56) References Cited

U.S. PATENT DOCUMENTS

| | | | | |
|---|---|---|---|---|
| 2007/0247106 | A1* | 10/2007 | Kawahara | B60L 3/0046 320/104 |
| 2009/0188733 | A1 | 7/2009 | Mack | |
| 2011/0087391 | A1* | 4/2011 | Pandit | B60K 6/485 701/22 |
| 2012/0316719 | A1* | 12/2012 | Hirsch | B60L 11/1824 701/22 |
| 2013/0079966 | A1* | 3/2013 | Terakawa | B60W 10/02 701/22 |
| 2013/0289811 | A1* | 10/2013 | Tolkacz | B60W 10/06 701/22 |
| 2013/0332020 | A1* | 12/2013 | Uchihara | B60W 20/12 701/22 |
| 2014/0148984 | A1* | 5/2014 | Nishi | B60K 6/485 701/22 |
| 2014/0288803 | A1* | 9/2014 | Deisler | B60W 10/06 701/103 |
| 2014/0312619 | A1* | 10/2014 | Plant | B60L 11/123 290/16 |
| 2015/0224864 | A1* | 8/2015 | Schwartz | B60K 6/28 180/65.245 |
| 2015/0291149 | A1* | 10/2015 | Kitabatake | B60K 6/445 701/22 |
| 2016/0221570 | A1* | 8/2016 | Chen | B60W 30/182 |
| 2016/0221571 | A1* | 8/2016 | Chen | B60W 10/06 |

* cited by examiner

TORQUE ASSIST BASED ON BATTERY STATE OF CHARGE ALLOCATION

TECHNICAL FIELD

This application generally relates to energy management for hybrid vehicles.

BACKGROUND

A hybrid-electric vehicle includes a fraction battery, an internal combustion engine and an electric machine. The engine may be operated to provide power for vehicle propulsion and accessory features. During operation, the traction battery may be charged or discharged based on the operating conditions including a battery state of charge (SOC), driver demand and regenerative braking

SUMMARY

A powertrain control system includes a fraction battery, an electric machine, and a controller. The electric machine is electrically coupled to the battery and configured to provide engine torque assist. The controller is programmed to respond to a change in state of charge (SOC) of the battery resulting from a current flow to the electric machine during the engine torque assist being greater than a predetermined change. The response of the controller is to halt the current flow to cease the engine torque assist.

A method of operating a vehicle having a traction battery and an electric machine includes halting a torque assist current flow to the electric machine. The halting is in response to a change in state of charge (SOC) of the battery attributed to the current flow being equal to a predetermined change of SOC apportioned for torque assistance to an engine.

A vehicle powertrain control system includes a traction battery, an electric machine, and a controller. The electric machine is coupled to the battery and configured to provide torque assistance to an engine. The controller is programmed to respond to a current flow to the electric machine greater than a predetermined electric charge. The response of the controller is to halt the current flow to the electric machine to cease torque assistance.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
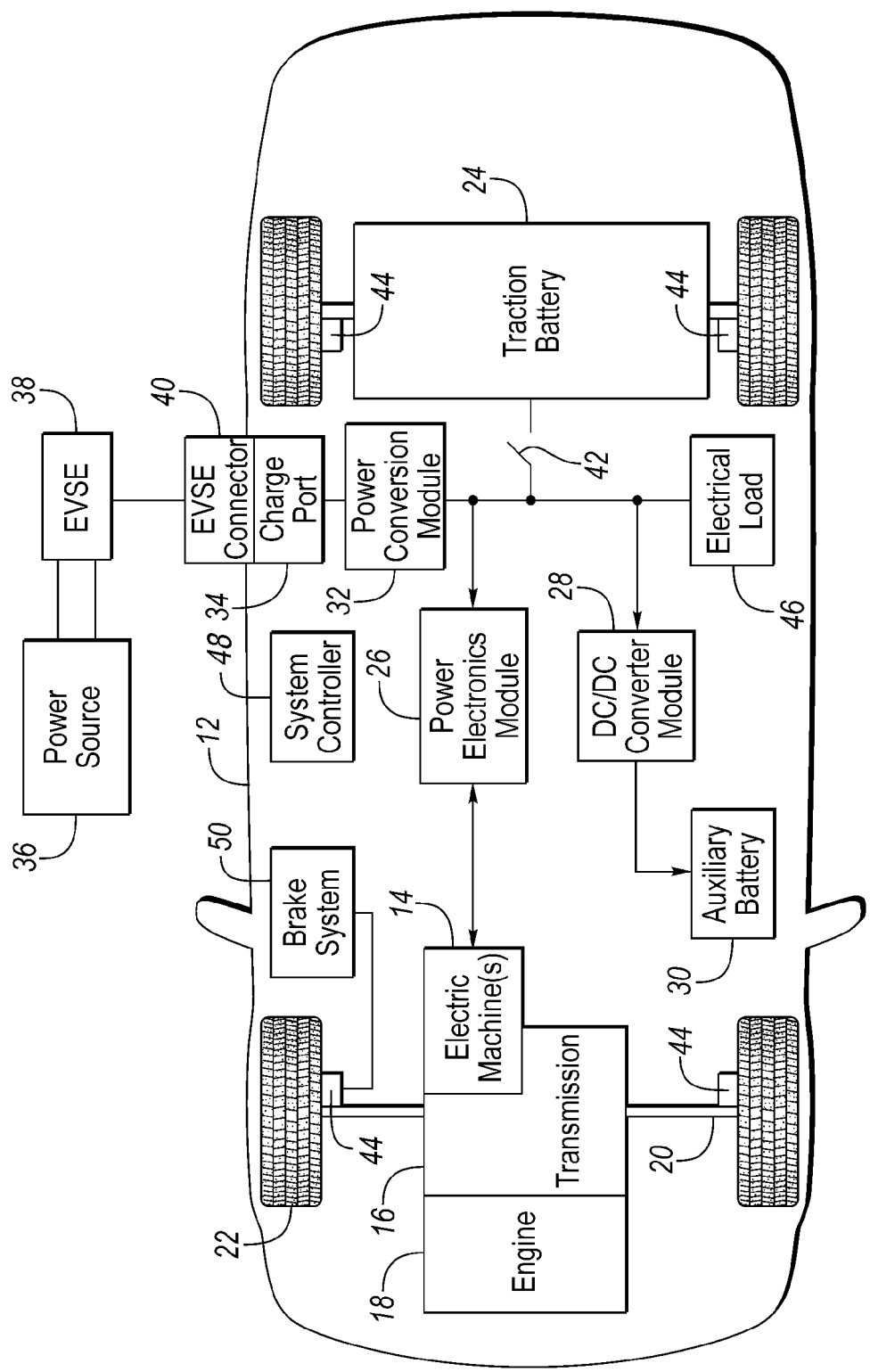
FIG. 1 is an exemplary diagram of a hybrid vehicle illustrating typical drivetrain and energy storage components.

FIG. 1 depicts a typical plug-in hybrid-electric vehicle (PHEV) having a powertrain or powerplant that includes the main components that generate power and deliver power to the road surface for propulsion. A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an internal combustion engine 18 also referred to as an ICE or engine. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. A powertrain has losses that may include transmission losses, engine losses, electric conversion losses, electric machine losses, electrical component losses and road losses. These losses may be attributed to multiple aspects including fluid viscosity, electrical impedance, vehicle rolling resistance, ambient temperature, temperature of a component, and duration of operation.

A fraction battery or battery pack 24 stores energy that can be used by the electric machines 14. A vehicle battery pack 24 typically provides a high voltage DC output. The traction battery 24 is electrically connected to one or more power electronics modules 26. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads 46, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet that receives utility power. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 or auxiliary electric loads may be connected to the high-voltage bus. The electrical loads 46 may have an associated controller that operates and controls the electrical loads 46 when appropriate. Examples of auxiliary electric loads or electrical loads 46 include a battery cooling fan, an electric air conditioning unit, a battery chiller, an electric heater, a cooling pump, a cooling fan, a window defrosting unit, an electric power steering system, an AC power inverter, and an internal combustion engine water pump.

The various components discussed may have one or more associated controllers to control and monitor the operation of the components. The controllers may communicate via a serial bus (e.g., Controller Area Network (CAN), Ethernet, Flexray) or via discrete conductors. A system controller 48 may be present to coordinate the operation of the various components.

Figure 2:
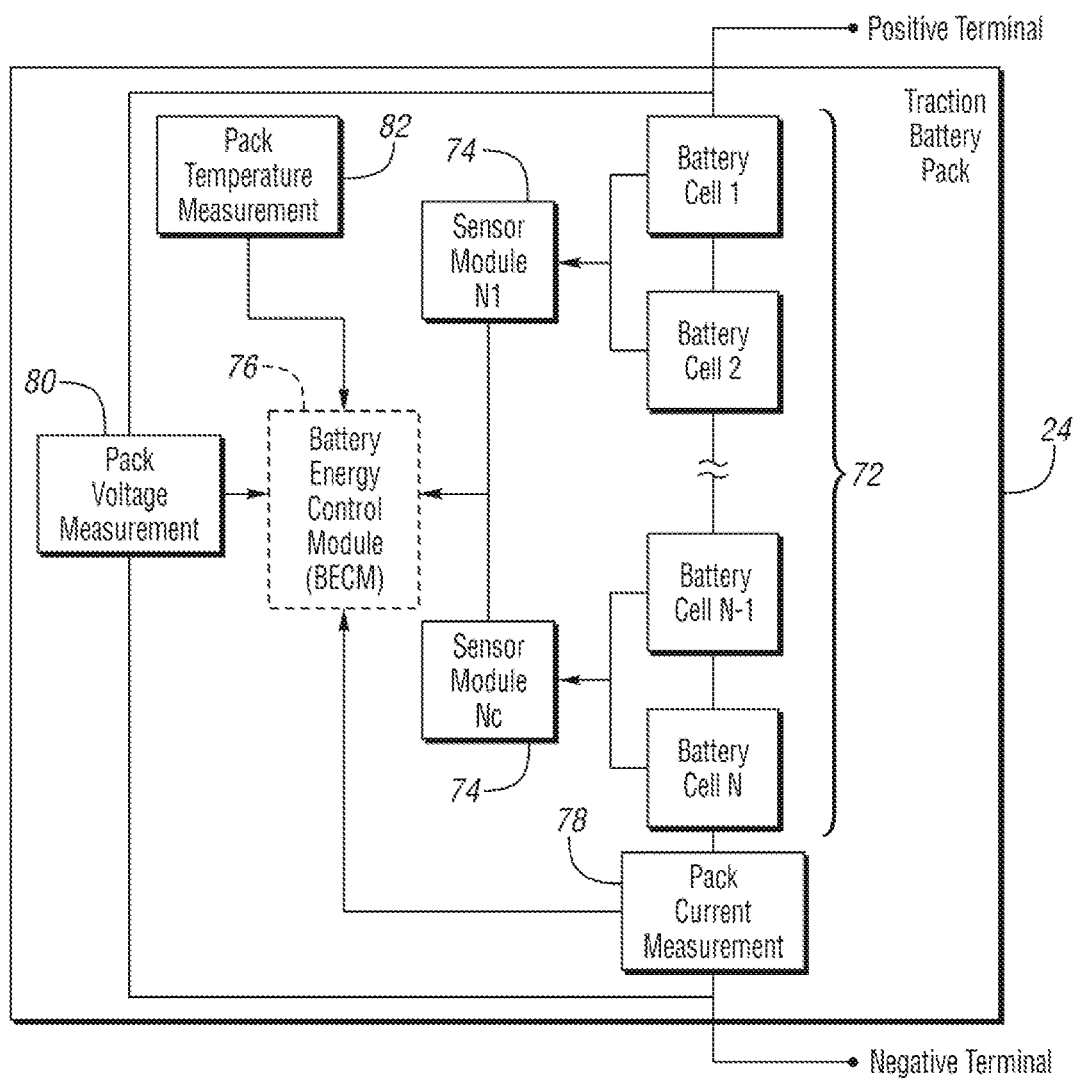
FIG. 2 is an exemplary diagram of a battery pack controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a series configuration of N battery cells 72. Other battery packs 24, however, may be composed of any number of individual battery cells connected in series or parallel or some combination thereof. A battery management system may have a one or more controllers, such as a Battery Energy Control Module (BECM) 76 that monitors and controls the performance of the traction battery 24. The BECM 76 may include sensors and circuitry to monitor several battery pack level characteristics such as pack current 78, pack voltage 80 and pack temperature 82. The BECM 76 may have non-volatile memory such that data may be retained when the BECM 76 is in an off condition. Retained data may be available upon the next key cycle.

In addition to the pack level characteristics, there may be battery cell level characteristics that are measured and monitored. For example, the terminal voltage, current, and temperature of each cell 72 may be measured. The battery management system may use a sensor module 74 to measure the battery cell characteristics. Depending on the capabilities, the sensor module 74 may include sensors and circuitry to measure the characteristics of one or multiple of the battery cells 72. The battery management system may utilize up to $N_c$ sensor modules or Battery Monitor Integrated Circuits (BMIC) 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module hardware may be integrated as part of the circuitry in the BECM 76 and the BECM 76 may handle the processing of raw signals.

The BECM 76 may include circuitry to interface with the one or more contactors 42. The positive and negative terminals of the traction battery 24 may be protected by contactors 42.

Battery pack state of charge (SOC) gives an indication of how much charge remains in the battery cells 72 or the battery pack 24. The battery pack SOC may be output to inform the driver of how much charge remains in the battery pack 24, similar to a fuel gauge. The battery pack SOC may also be used to control the operation of an electric or hybrid-electric vehicle 12. Calculation of battery pack SOC can be accomplished by a variety of methods. One possible method of calculating battery SOC is to perform an integration of the battery pack current over time. This is well-known in the art as ampere-hour integration.

Battery SOC may also be derived from a model-based estimation. The model-based estimation may utilize cell voltage measurements, the pack current measurement, and the cell and pack temperature measurements to provide the SOC estimate.

The BECM 76 may have power available at all times. The BECM 76 may include a wake-up timer so that a wake-up may be scheduled at any time. The wake-up timer may wake up the BECM 76 so that predetermined functions may be executed. The BECM 76 may include non-volatile memory so that data may be stored when the BECM 76 is powered off or loses power. The non-volatile memory may include Electrical Eraseable Programmable Read Only Memory (EEPROM) or Non-Volatile Random Access Memory (NVRAM). The non-volatile memory may include FLASH memory of a microcontroller.

When operating the vehicle, actively modifying the way battery SOC is managed can yield higher fuel economy or longer EV-mode (electric propulsion) operation, or both. The vehicle controller must conduct these modifications at both high SOC and low SOC. At low SOC, the controller can examine recent operating data and decide to increase SOC via opportunistic engine-charging (opportunistic means to do this if the engine is already running) This is done to provide longer EV-mode operation when the engine turns off. Conversely, at high SOC, the controller can examine recent operating data and other data (location, temperature, etc.) to reduce SOC via EV-mode propulsion, reduced engine output, or auxiliary electrical loads. This is done to provide higher battery capacity to maximize energy capture during an anticipated regenerative braking event, such as a high-speed deceleration or hill descent.

Figure 3:
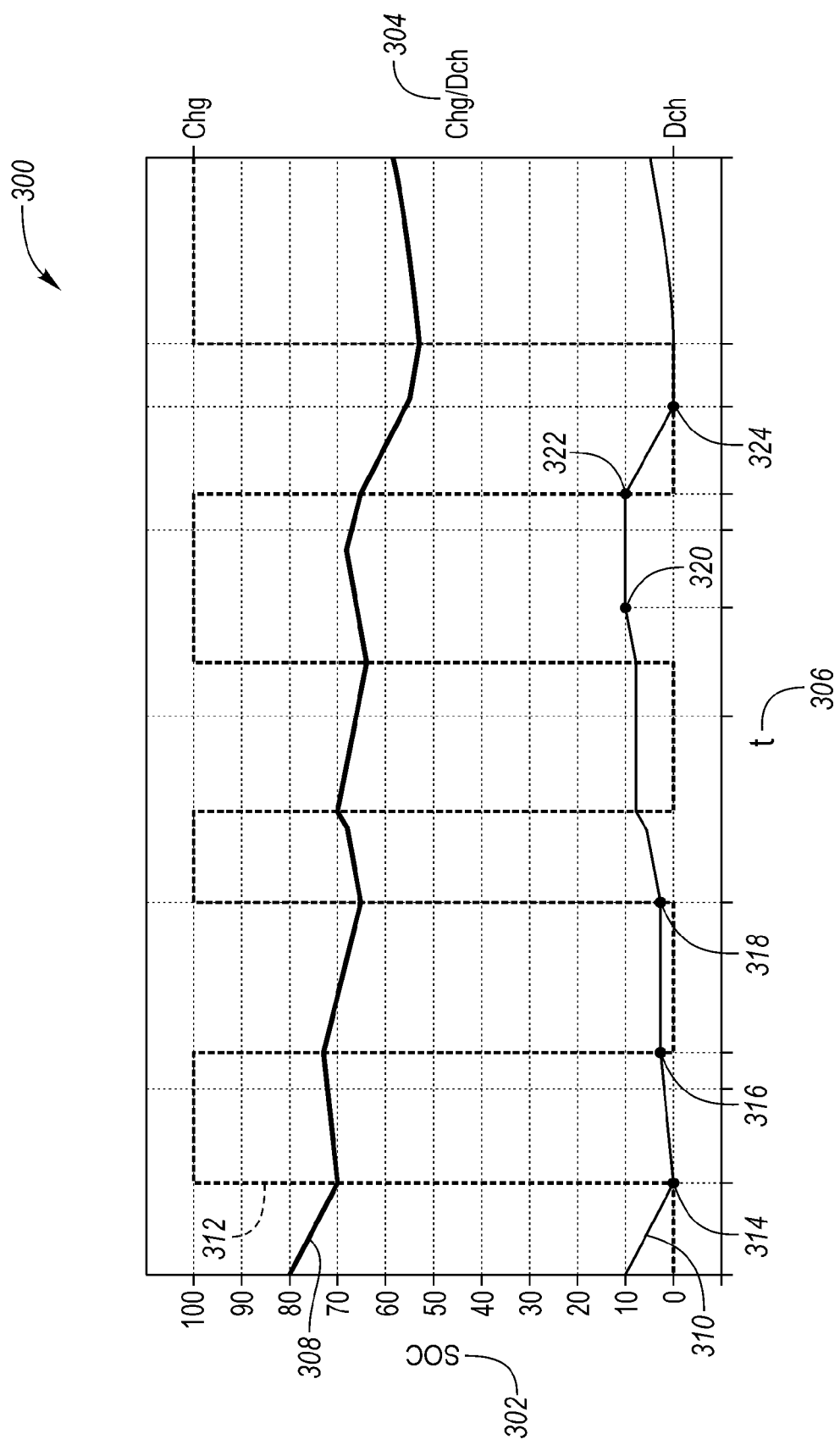
FIG. 3 is an exemplary graph that illustrates battery state of charge and torque assistance allocation in relation to time.

FIG. 3 is an exemplary graph 300 that illustrates battery state of charge and torque assistance allocation in relation to time. The graph shows a traction battery state of charge (SOC) 302 along with battery charge and discharge cycles 304 with respect to time 306. The traction battery SOC is represented by the line 308 and the traction battery SOC level of an allocation or ration of battery SOC is represented by line 310. Here, the level of the allocation 310 is specifically for torque assistance. When a vehicle is propelled by an internal combustion engine and a driver power demand or driver demand exceeds the power capability of the engine, an electric machine coupled to the drive wheels may be used to provide a torque to assist the torque applied by the engine. The torque assistance in this exemplary graph is shown to be 10% of the total battery SOC. However, the percentage may vary based on vehicular characteristics including battery capacity, vehicle mass, desired performance profile. Also, a vehicle may be equipped with a powertrain operation mode switch. The powertrain operation mode switch may be used to select a mode of operation out of a plurality of operating modes including economy, normal, towing, pursuit, sport or performance. The mode of operation may have a corresponding percentage, for example, an allocation percentage for economy mode operation may be less than 10%, a percentage for normal mode may be 10 to 20%, and a percentage for sport or performance mode may be as much as 40%. And, a percentage for pursuit mode for an emergency vehicle may be 80%.

The SOC allocation 310 has an associated torque assistance state or variable which has two states, enable and disable. The state may be implemented in hardware such as flip-flops or combinational logic, or it may be implemented in software in which a controller or processor is programmed to toggle the state and based on the state, the controller may activate features. In this example, the state toggles from disable to enable upon the SOC allocation 310 equal to 10% SOC due to a recharge current. And, the state toggles from enable to disable upon the SOC allocation 310 equal to 0% SOC due to a current flow to the electric machine to provide torque assistance to the engine. This hysteresis may be adjusted so that the enable and disable toggle points are independent of the total SOC allocation of 10%. For example, while maintaining the SOC allocation of 10%, the torque assistance enable may be set at 5%, so that once the SOC allocation equals 5%, the state will toggle to enable and torque assistance will be available based on a pedal demand event. A pedal demand event includes a request from a driver during a drive cycle for a change in power, such as propulsion power. For example, a driver moving a foot pedal may constitute a request for a change in power. A benefit of this is that it may allow torque assistance during certain stop and go traffic in which it was disabled when the hysteresis required the full allocation.

The charging and discharging of the battery 312 is based on a direction of current flow from an electric machine. A current generated by the electric machine is represented by a high indication equal to the Chg level, and a current flowing into the electric machine is represented by a low indication equal to the Dch level. Here, the vehicle is first propelled using torque assistance, which depletes the SOC 308, which is reduced from approximately 80% to 70%. This reduction of SOC has a corresponding reduction of the SOC allocated to torque assist. In general, torque assistance from the electric machine may require a pedal demand event in which the power request associated with the pedal demand exceeds the available power from the internal combustion engine. Also, torque assistance may require a battery SOC greater than a threshold such as a minimum SOC, or that an allocation of battery SOC is greater than a SOC threshold. In this exemplary graph, the SOC allocation 310 to torque assistance is reduced from 10% to 0% at which point the allocation equals a lower SOC allocation and the torque assistance is disabled at time 314 by toggling TA_disable. As the battery is recharged from point 314 to point 316, the SOC allocation 310 to torque assistance is increased by the same percentage. During the SOC discharge between point 316 and 318, the SOC allocation 310 to torque assistance is held constant as the decrease in SOC is not attributable to torque assistance. The SOC allocation 310 associated with torque assistance continues to increase based on charging of the battery until the SOC allocation 310 is equal to a threshold. In this example, the threshold is 10% which is equal to the total SOC allocated to torque assistance. When the SOC allocation 310 equals 10% at point 320, torque assistance is again enabled, however, as there is no power request from a pedal demand event greater than the engine power, current does not flow to the electric machine to provide torque assistance. However, at point 322 when the power request from a pedal demand event is greater than the engine power and the SOC allocation state is enabled, a current will flow to the electric machine to provide torque assistance. The current to the electric machine continues until the torque assistance is disabled at point 324 as a result of the SOC allocation 310 being reduced to 0%.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A powertrain control system comprising:
   a traction battery;
   an electric machine electrically coupled to the battery and configured to provide engine torque assist; and
   a controller programmed to, in response to a detected change in state of charge (SOC) of the battery resulting from a current flow to the electric machine during the engine torque assist being greater than a predetermined value selected according to powertrain operating mode such that the value is greater in normal mode than economy mode, halt the current flow to cease the engine torque assist.

2. The system of claim 1, wherein the controller is further programmed to, in response to a battery recharge current flow representative of an amount of energy equal to energy associated with the predetermined value, reinitiate the current flow to the electric machine based on pedal demand.

3. The system of claim 1, wherein the controller is further programmed to set the predetermined value for each of a plurality of drive cycles.

4. The system of claim 1, wherein the controller is further programmed to set the predetermined value for each of a plurality of pedal demand events.

5. A method of operating a vehicle having a traction battery and an electric machine comprising:
   halting a torque assist current flow to the electric machine in response to a detected change in state of charge (SOC) of the battery, attributed to the current flow, becoming equal to a predetermined value that is selected according to powertrain operating mode such that the value is greater for sport mode than economy mode.

6. The method of claim 5 further including setting the predetermined value for each of a plurality of pedal demand events.

7. The method of claim 5, wherein the predetermined value is a fraction of the SOC.

8. The method of claim 5 further comprising reinitiating the current flow to the electric machine based on pedal demand in response to a battery recharge current flow representative of an amount of energy equal to energy associated with the predetermined value.

9. The method of claim 5 further including setting the predetermined value for each of a plurality of drive cycles.

10. A system comprising:
    a traction battery;
    an electric machine electrically coupled to the battery and configured to provide torque assistance to an engine; and
    a controller programmed to, in response to an amount of current flow to the electric machine greater than a predetermined value selected according to powertrain operating mode such that the value is greater in sport mode than normal mode, halt the current flow to the electric machine to cease torque assistance.

11. The system of claim 10, wherein the controller is further programmed to set the predetermined value for each of a plurality of drive cycles.

12. The system of claim 10, wherein the controller is further programmed to set the predetermined value for each of a plurality of pedal demand events.

13. The system of claim 10, wherein the predetermined value charge is a fraction of an electric charge capacity of the battery.

14. The system of claim 10, wherein the controller is further programmed to, in response to a battery recharge current flow representative of an amount of energy equal to energy associated with the predetermined value, reinitiate the current flow to the electric machine based on pedal demand.

* * * * *